United States Patent [19]
Kato et al.

[11] Patent Number: 5,228,368
[45] Date of Patent: Jul. 20, 1993

[54] CONTROL SYSTEM FOR SUPERCHARGED ENGINE/AUTOMATIC TRANSMISSION COMBINATION

[75] Inventors: Yuji Kato, Tokyo; Etsuki Date, Fujisawa, both of Japan

[73] Assignee: Nissan Motor Co., Ltd., Yokohama, Japan

[21] Appl. No.: 794,142

[22] Filed: Nov. 19, 1991

[30] Foreign Application Priority Data

Nov. 19, 1990 [JP] Japan .................................. 2-315555

[51] Int. Cl.⁵ .......................................... B60K 41/06
[52] U.S. Cl. ..................................... 74/866; 364/424.1
[58] Field of Search ........................ 74/866; 364/424.1

[56] References Cited

U.S. PATENT DOCUMENTS

| | | | |
|---|---|---|---|
| 4,691,285 | 9/1987 | Takeda | 74/866 X |
| 4,774,858 | 10/1988 | Ganoung | 74/866 X |
| 4,945,481 | 7/1990 | Iwatsuki et al. | 74/866 X |

FOREIGN PATENT DOCUMENTS 61-113526 5/1986 Japan .
63-17131 1/1988 Japan .

Primary Examiner—Leslie A. Braun
Assistant Examiner—Daniel Wittels
Attorney, Agent, or Firm—Foley & Lardner

[57] ABSTRACT

In order to alleviate sporadic shift shock when a transmission associated with a supercharged internal combustion engine undergoes an upshift while the engine is operating under minimal load (e.g. with the accelerator pedal non-depressed) the supercharge pressure is monitored and if the pressure is above a predetermined limit during a minimal load upshift, the pressure generated by the supercharging device is reduced and at the same time an idle control system feed-back meters the amount of air supplied to the engine so that the rate at which the engine speed reduces is maintained essentially constant irrespective of the initial supercharge pressure.

8 Claims, 4 Drawing Sheets

CONTROL SYSTEM FOR SUPERCHARGED ENGINE/AUTOMATIC TRANSMISSION COMBINATION

BACKGROUND OF THE INVENTION

1. Field of the Invention

The present invention relates generally to an engine/transmission system and more specifically to such a system wherein the engine is supercharged using either one, or both of a supercharger and a turbocharger.

2. Description of the Prior Art

JP-A-63-17131 and JP-A-61-113526 disclose examples of arrangements wherein engines are combined with automatic transmissions. However, in these arrangements the engine torque and the transmission shifting are controlled independently of one another. As a result, during transmission shifting, if engine torque control is either initiated or stopped, a relatively large shift shock tends to be produced and leads to the situation wherein erratic shift shocks tend to occur.

In order to overcome this problem it was proposed to provide communication between the transmission and engine torque control units and to limit the initiation and termination of engine torque control during transmission shifting.

However, this arrangement suffers from the drawback that this arrangement controls only the ignition timing or air-fuel ratio and ignores the effect of a supercharging device such as an exhaust gas driven turbocharger or mechanically driven supercharger. Thus, during upshifts which are induced under minimum engine load conditions (non-depressed accelerator pedal conditions) still a wide variation in shift shock are encountered.

That is to say, in an engine/transmission system wherein the engine is supercharged, the amount of shift shock will vary depending on the presence or absence of supercharge pressure at the time an upshift is produced under minimal engine load. By way of example, even in the case wherein the induction system is synchronously controlled with the other torque control measures, the actual amount of air which is supplied to the engine varies. That is to say, the rate at which the engine speed drops (dashpot rate) is effected by the supercharge pressure in a manner wherein under some conditions it is rapid and slow under others. This variation in engine speed is basic cause of the shift shock generation.

It should be noted that depending on the presence or absence of supercharge pressure, until the engine speed reaches a predetermined level (e.g. 3000 rpm) the supercharge produces relatively little effect. However, after this level is exceeded the effect of the supercharge pressure increases dramatically. For example, in the case where the external load on the engine is high and the accelerator pedal depression changes from a state wherein a high supercharge pressure is induced in the induction manifold, to a fully released state, even though the throttle valve assumes a fully closed state, the supercharge pressure tends to remain. On the other hand, if the accelerator pedal moves from a half-throttle position to a fully released one while the engine load is low and the supercharging level is low, the induction pressure soon becomes negative.

SUMMARY OF THE INVENTION

It is an object of the present invention to provide a control system which alleviates sporadic shift shock when a transmission associated with a supercharged internal combustion engine undergoes an upshift while the engine is operating under minimal load (e.g. with the accelerator pedal non-depressed).

In brief, the above object is achieved by an arrangement wherein the supercharge pressure is monitored and if the pressure is above a predetermined limit during a minimal load upshift, the pressure generated by the supercharging device is reduced and at the same time an idle control system feed-back meters the amount of air supplied to the engine so that the rate at which the engine speed reduces is maintained essentially constant irrespective of the initial supercharge pressure.

More specifically, a first aspect of the present invention comes in a system which includes a internal combustion engine and an automatic transmission and which features: means responsive to a supercharge pressure control signal for supplying a super charge pressure to the internal combustion engine; a supercharge pressure sensor; an accelerator pedal depression sensor; means for producing a transmission shift control signal; and means for producing a supercharge pressure reduction control signal when an upshift is induced under conditions wherein the accelerator pedal is not depressed and the supercharge pressure is above a predetermined level.

A second aspect of the present invention comes in a vehicular system which features: a supercharger operatively connected with an internal combustion engine for supplying air under pressure to the engine; a supercharge pressure sensor; an engine load sensor for producing a signal indicative of the engine operating under minimal load; an automatic transmission operatively connected with the engine; means for monitoring the operation of the transmission and for indicating the transmission undergoing a shift; and supercharge pressure control means responsive to the supercharge pressure sensor, the engine load sensor and the indication from the transmission monitoring means that the transmission is operating under minimum engine load and undergoing an upshift, for reducing the supercharge pressure in the event that the supercharge pressure is above a predetermined level while the transmission is shifting.

A third aspect of the present invention comes in a vehicular system which features: supercharger means operatively connected with an internal combustion engine for supplying air under pressure to and induction system of the engine; supercharger control means for varying the amount of supercharge pressure produced by the supercharger; a supercharge pressure sensor, for sensing the level of supercharge pressure in the engine induction system; an engine load sensor for producing a signal indicative of the engine operating under minimal load; an automatic transmission operatively connected with the engine; means for monitoring the operation of the transmission and for indicating the transmission undergoing an upshift; idle control means for controlling the amount of air which is supplied to the engine while the engine is operating under minimal load conditions; and supercharge pressure control means responsive to the supercharge pressure sensor, the engine load sensor and the indication from the transmission monitoring means that the transmission is operating under minimum engine load and undergoing an upshift, for reducing the amount of supercharge pressure produced by the supercharger and for controlling the amount of air which is supplied to the engine so that the rate at which the engine speed reduces is maintained at essentially the same value irrespective of the level from which the supercharge pressure is reduced when the transmission is upshifting under minimal engine load.

DETAILED DESCRIPTION OF THE PREFERRED EMBODIMENTS

Figure 1:
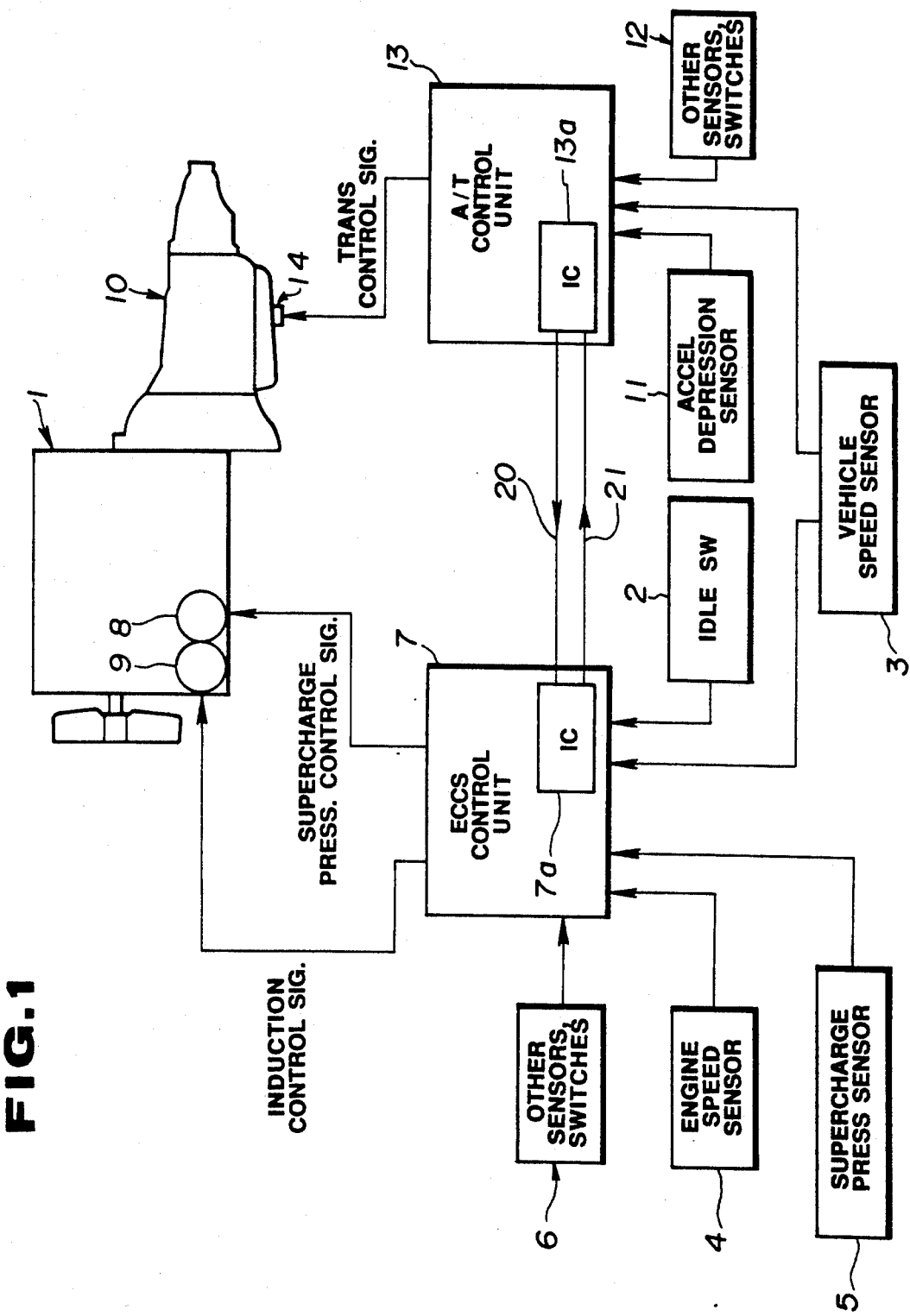
FIG. 1 is a block diagram showing the conceptual arrangement of the present invention.

FIG. 1 shows a system which basically comprises a turbocharged engine 1 operatively connected with an automatic transmission 10. The system includes an idle detection switch 2, a vehicle speed sensor 3, an engine speed sensor 4, a supercharge pressure sensor 5 and miscellaneous other switches and sensors generally denoted by black box 6. These sensors are operatively connected with an ECCS type engine control unit 7 in a manner wherein suitable data required to determine the nature of a supercharge pressure control signal which is applied to a supercharge pressure control solenoid 8 and an induction control signal which is applied to an AAC valve 9 which forms part of an idle control system.

Figure 3:
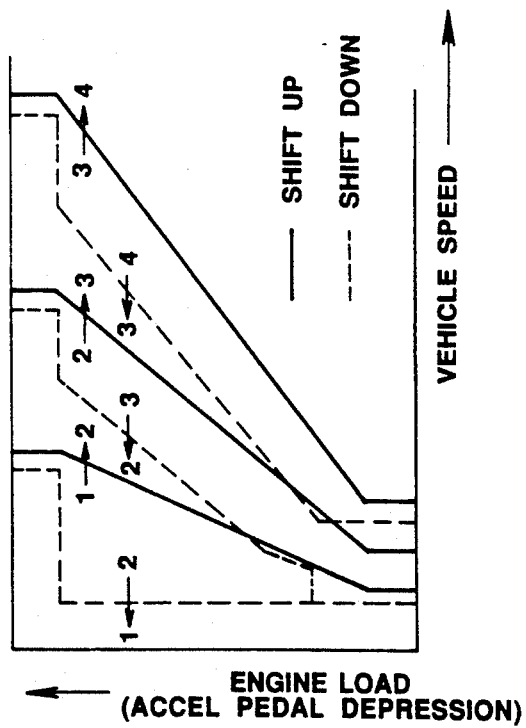
FIG. 3 is a shift schedule according to which the transmission shown in FIG. 1 is controlled.

An accelerator pedal depression sensor 11 along with suitable other switches generally denoted by element 12 are operatively connected with an automatic transmission (A/T) control unit 13 and is supplied with data input therefrom. As will noted, the output of the vehicle speed sensor 3 is also supplied to the A/T control unit 13. The A/T control unit 13 is arranged to output a control signal or signals to one or more transmission control solenoids generally denoted by numeral 14. The A/T control unit includes a microprocessor or the like type of circuit arrangement which controls the shifting of the transmission in accordance with a shift schedule of the nature shown in FIG. 3. As will be appreciated, this schedule is recorded in terms of vehicle speed and engine load as indicated by the amount of accelerator pedal depression.

The ECCS control unit 7 and the A/T control unit 13 include IC data transfer circuits 7a and 13a which are placed in communication with one another by transmission lines 20 and 21. This arrangement enables the two circuits to be informed of the given operations (viz., operations which are pertinent to shift shock attenuation) being performed by the other on a real time basis.

In the control network established by the above arrangement, data indicating if the transmission is undergoing a shift, the gear position in which the transmission is operating and/or the position to which the shift is being made, and if the shift is being made with the accelerator in a non-depressed condition, is transferred from IC 13a to IC 7a.

Depending on the transmission operating conditions it is determined if the instant supercharge pressure level is above a predetermined level or not. In the event that the instant supercharge or boost pressure is found to be too high, the signal which is applied to the waste gate control solenoid 8 is modified in a manner which increases the amount of exhaust gases which are permitted to by-pass the turbocharger turbine and thus reduce the amount of energy with which the turbocharger compressor is driven.

Figure 2:
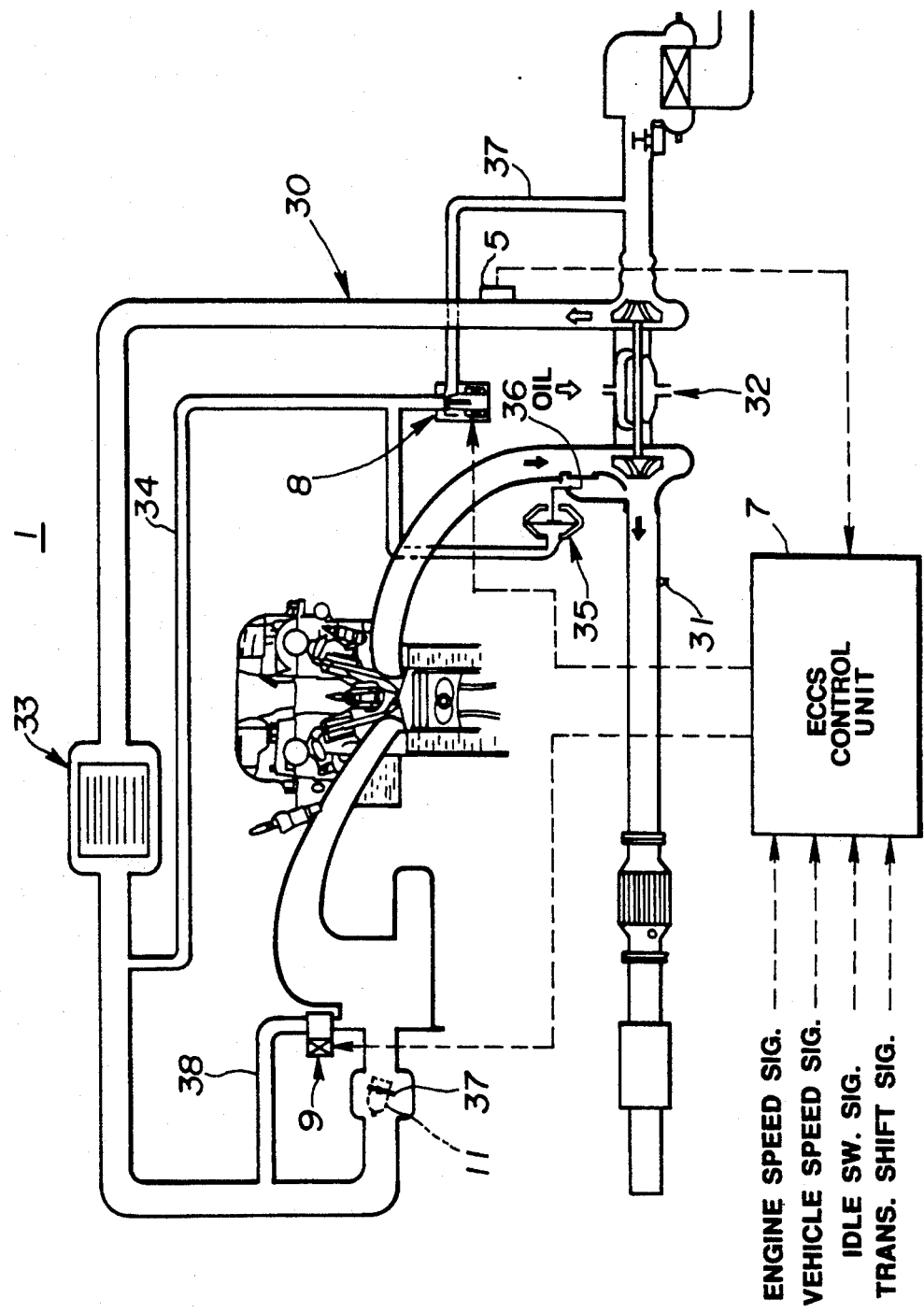
FIG. 2 is a schematic view showing an engine system to which the present invention is applied.

FIG. 2 shows an example of a turbocharged engine and the manner in which the ECCS control unit is operatively connected therewith. As shown, a turbocharger 32 is operatively arranged with induction and exhaust conduits 30 and 31, in a conventional manner. An intercooler 33 is disposed in the induction conduit at a location downstream of the turbocharger compressor. A control pressure conduit 34 leads from the induction conduit at a location downstream of the intercooler, to a pneumatically operated waste gate servo motor or so called swing valve 35. The waste gate control solenoid 8 is arranged to control the amount of pressure which is permitted to vent from the control pressure conduit 34 into a by-pass conduit 37 which leads back to the induction conduit and communicates therewith at a location upstream of the turbocharger compressor. In this instance, when the solenoid 8 is energized (ON) communication between the conduits 34 and 37 is cut-off and the amount pressure which is supplied to the servo chamber of the swing valve 35 is maximized, the waste gate 36 is induced to close and the amount of exhaust gas which is permitted to by-pass the turbocharger turbine is minimized. On the other hand, when the solenoid valve is OFF the pressure which is supplied to the servo chamber of the swing valve 35 is reduced, the waste gate 36 is permitted to open and the amount of exhaust gases which are permitted to by-pass the turbine is increased.

The AAC valve 9 is arranged in the induction system in a manner to control the amount of induction air which is permitted to pass through a by-pass conduit 38 and by-pass a throttle valve 37. The signal which is applied to the AAC valve 9 switches between high and low levels (ON/OFF) at a predetermined frequency. By increasing the period for which the signal assumes the high (ON) level, the amount of air which is permitted to by-pass the throttle valve is increased.

Figure 4:
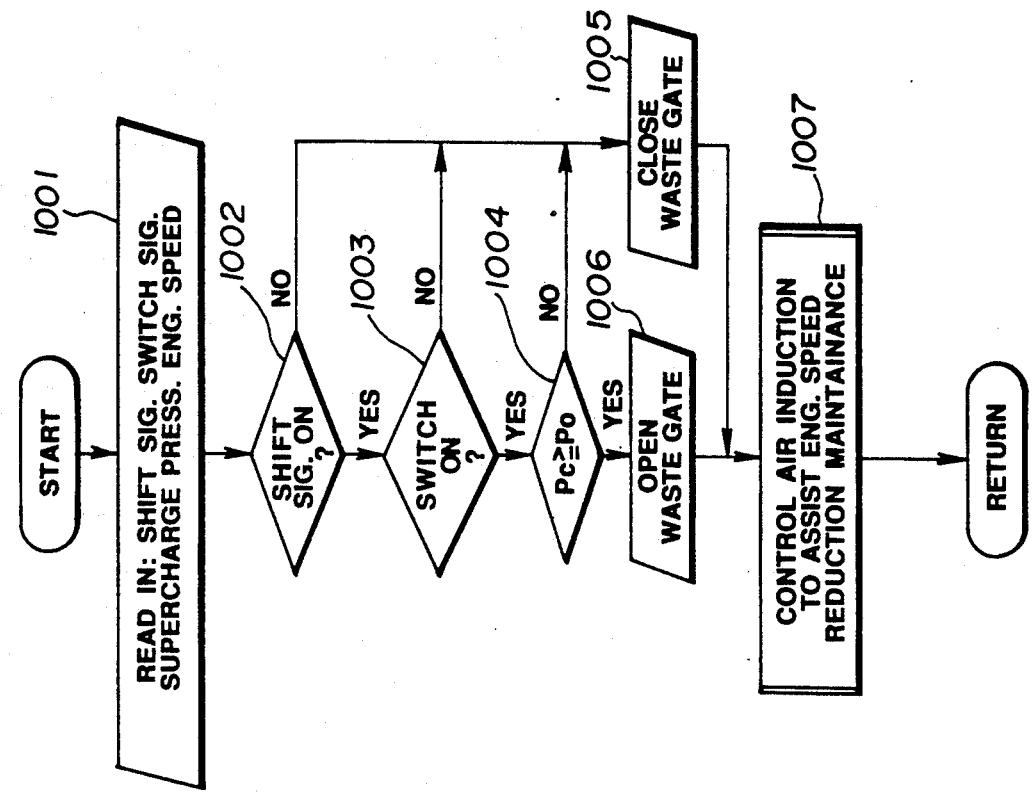
FIG. 4 is a flow chart depicting the operations which characterize a control routine according to the present invention.

The operation of the above arrangement will be discused with reference to the flow chart shown in FIG. 4. This flow chart depicts a control routine which is run in the ECCS control unit 7 and which is used to control the supercharge pressure and idling speed.

At step 1001 signals which are indicative of the transmission undergoing a shift, the status of the idle switch, the level of the supercharge pressure and the engine speed are read in. At step 1002 it is determined if the "shift signal" as will be referred to, exhibits a high level (transmission is undergoing a shift) or not. In the event of an affirmative outcome the routine goes to step 1003 wherein it is determined if the idle switch signal is indicative of the throttle valve being fully closed or not.

In the event that the throttle valve is indicated as being fully closed, the routine proceeds to step 1004 wherein it is determined if the instant supercharge pressure (Pc) is indicated as being above a predetermined level (Po) or not.

In response to a finding that Pv<Po and in response to negative outcomes in steps 1002 and 1003, the routine goes to step 1005 wherein a command to close the waste gate is issued. This command is such as to induce the supercharge pressure control solenoid 8 to assume an ON (energized) condition, and to result in the swing valve 35 closing the waste gate 36. On the other hand, if the outcome of step 1004 is such as to indicate that Pc≧Po the routine goes to step 1006 wherein a command to set the supercharge pressure control solenoid 8 to OFF is issued. This of course induces the swing valve 35 to open the waste gate 36.

Step 1007 follows either of steps 1005 and 1006. In this step feedback control of the engine idling speed is executed in a manner which limits the degree to which the engine speed is permitted to reduce. This control is accomplished by controlling the ACC valve 9 and the amount of air which is permitted to by-pass the closed throttle valve 37. As such feedback control of the engine speed and how it is accomplished will be self-evident to those skilled in automotive engineering, detailed disclosure of the same will be omitted for the sake of brevity.

Figure 5:
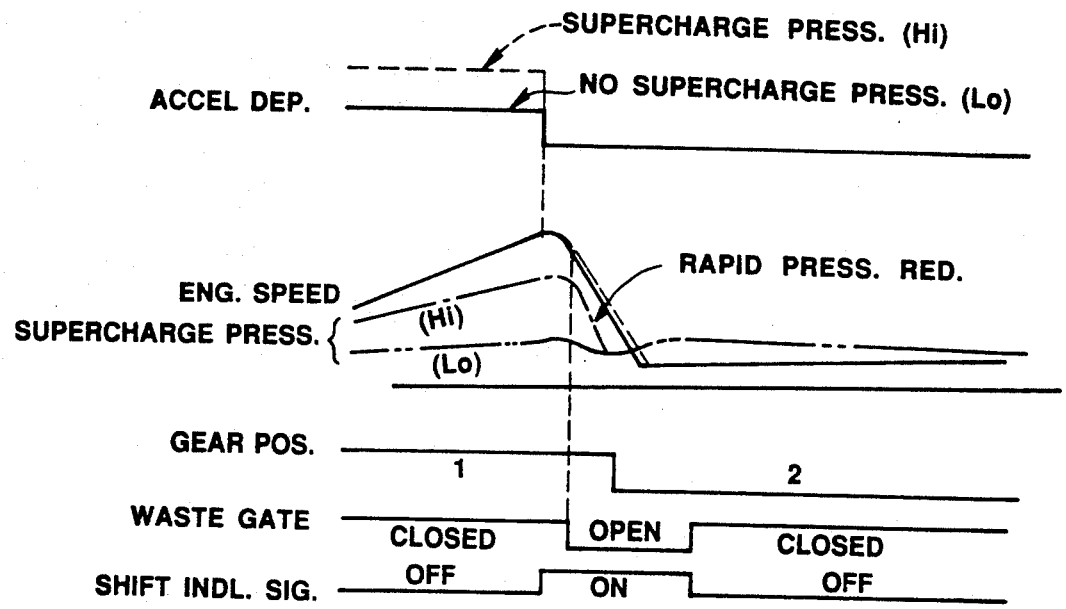
FIGS. 5 and 6 are timing charts depicting the supercharge pressure control which is achieved with the present invention and that provided by the the prior art, respectively.
Figure 6:
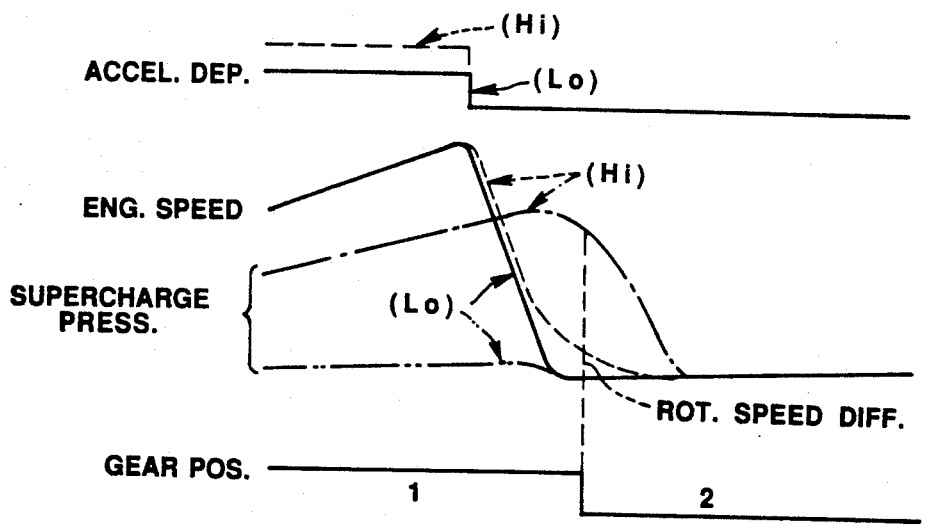

An example of the control which is implemented during a minimum engine load upshift is given in timing chart form in FIG. 5. In the case an upshift which takes place under the conditions wherein a half-throttle condition changes to a fully released accelerator pedal one and the supercharge pressure disappears, given that the shifting and idling conditions are satisfied while the supercharge pressure is still less than the predetermined limit Po, the waste gate remains closed. However, at this time the amount of air which is permitted to be supplied to the engine is controlled in the same manner as in the case of a non-supercharged engine and the rate at which the the engine speed is permitted to reduce is limited to a predetermined value and the upshift (e.g. a 1-2 upshift) is timed to occur when the engine speed has reduced to a given low level.

In the case of an upshift which occurs after a full throttle condition has changed to a fully released or non-depressed accelerator pedal state, the shifting and idle requirements will be satisfied and the waste gate will be opened due to the elevated supercharge pressure.

As a result, from the time the waste gate opens the supercharge pressure exhibits a rapid decrease and, due to the idle control system which determines the amount of air which is permitted to by-pass the closed throttle valve 37 via by-pass conduit 38, the rate at which the engine speed is permitted to decrease is limited to almost exactly the same value as in the case wherein the supercharge pressure was absent, and the upshift (e.g. the 1-2 upshift) occurs just as the engine speed has reduced to the above mentioned given low level.

With the above control it is possible to realize the following advantages with supercharged engine/transmission systems.

1. When a minimum engine load upshift occurs as the supercharge pressure is sensed and its presence or absence determined, it is possible to control the induction pressure level in a manner wherein the difference in the amount of air which is supplied to the engine in the presence and absence of supercharge pressure, can be reduced to a small value and random shift shock generation prevented.

2. When a minimum engine load upshift takes place, irrespective of the supercharge pressure level which prevailed immediately before the shift, at the time the shift initiates the induction pressure can be controlled so that almost no difference occurs. It is also possible for the rate at which the engine speed reduces to be simultaneously controlled to essentially the same value via controlling the amount of air which is permitted to pass through the idle control system. This results in the timing with which the engine speed reaches a given value in the absence of supercharge pressure being essentially the same timing as in the case wherein a high supercharge pressure was initially present and enables very effective attenuation of the shift shock.

It will be appreciated that the present invention is not limited to the disclosed embodiment and that various variations are possible without departing from the scope of the same.

For example, even though the turbocharger is disclosed as having a waste gate for by-passing exhaust gases about the turbine thereof, the use of variable capacity devices which enable the amount of supercharge pressure to be controlled without the need of waste gating and the like can be envisaged.

Further, as supercharge pressure and induction air control systems are combined, while the supercharge pressure control is disclosed as being basically of the ON/OFF type, it is possible determined the amount of movement which lead to the accelerator pedal assume the non-depressed state and vary the degree to which the supercharge pressure is reduced, based on the same.

What is claimed is:

1. A vehicular system comprising: a supercharger operatively connected with an internal combustion engine for supplying air under pressure to said internal combustion engine;

a supercharge pressure sensor;

an engine load sensor for producing a signal when said internal combustion engine is operating under a minimal load;

an automatic transmission operatively connected with said internal combustion engine;

monitoring means for monitoring operation of said automatic transmission and for indicating when said automatic transmission is undergoing a shifting operation;

supercharge pressure control means, responsive to output from said supercharge pressure sensor, said engine load sensor and said monitoring means, for reducing supercharge pressure when said automatic transmission is operating under minimum engine load and undergoing said shifting operation and said supercharge pressure sensor indicates that current supercharge pressure is above a predetermined level.

2. A vehicular system comprising: supercharger means operatively connected with an internal combustion engine for supplying air under pressure to an engine induction system;

supercharger pressure control means for varying the amount of supercharge pressure produced by said supercharger means;

a supercharge pressure sensor, for sensing a level of supercharge pressure in said engine induction system and for indicating when said level exceeds a predetermined level;

an engine load sensor for producing a signal indicative of an engine operating load;

an automatic transmission operatively connected with said internal combustion engine;

means for monitoring said automatic transmission and for indicating when said automatic transmission is undergoing an upshift; and idle control means for controlling an amount of air which is supplied to said internal combustion engine when said internal combustion engine is operating under minimal load conditions;

wherein said supercharge pressure control means is responsive to said supercharge pressure sensor, said engine load sensor and said indication from said means for monitoring said automatic transmission, said supercharge pressure control means reduces the amount of supercharge pressure produced by said supercharger and controls the amount of air which is supplied to said internal combustion engine so that the rate at which the engine speed reduces is maintained at an essentially constant value irrespective of a level from which the supercharge pressure is reduced when said automatic transmission is upshifting under minimal engine load.

3. A vehicular system as recited in claim 2 further comprising a turbocharger.

4. A vehicular system as recited in claim 3 wherein said supercharger control means comprises a waste gate through which exhaust gases can be selectively by-passed around a turbine of said turbocharger.

5. A vehicular system as recited in claim 2 wherein said engine lead sensor comprises an accelerator pedal depression degree sensor.

6. A vehicular system as recited in claim 2 wherein said idle control means comprises:

a by-pass conduit which by-passes a throttle valve which is disposed in an induction conduit through which pressurized air from said supercharger means is supplied to said internal combustion engine; and a valve which is disposed in said by-pass conduit and which controls the amount of air which is permitted to pass therethrough.

7. An apparatus for carrying out control over an engine system including an intake air charging means and an automatic power transmission, said apparatus comprising:

a) signal producing means for providing an external command signal;

b) means for detecting an intake air charge pressure supplied to an engine by said intake air charging means;

c) means for detecting an operating variable of an engine driving force adjusting mechanism and for outputting a release signal to said signal producing means when said detected operating variable becomes null;

d) means for detecting whether a gear shift operation is occurring in said automatic power transmission and for indicating to said signal producing means whether said gear shift operation is occurring;

e) means for determining whether said detected intake air charge pressure exceeds a threshold value and for indicating to said signal producing means when said detected intake air charge pressure exceeds a said threshold value; and f) means for controlling said intake air charge pressure in response to said external command signal, said intake air charge pressure being reduced below said threshold when said release signal is issued, said gear shift operation is occurring and said detected intake air charge pressure exceeds said threshold value.

8. A method for carrying out a total control over an engine system including an intake air charging means and an automatic power transmission, said method comprising the steps of:

a) detecting a supercharge pressure supplied to said engine and said intake air charging means;

b) detecting an operating variable of an engine driving force adjusting mechanism and outputting a release signal when detecting that said operating variable becomes null;

c) detecting whether a gear shift operation is occurring in said automatic power transmission;

d) determining whether said detected supercharge pressure exceeds a threshold value;

e) controlling intake air charge pressure; so that said intake air charge pressure is reduced below said threshold value when said release signal is issued, said gear shift operation is occurring, and said detected supercharge pressure exceeds said threshold value.

* * * * *